Figure 1:
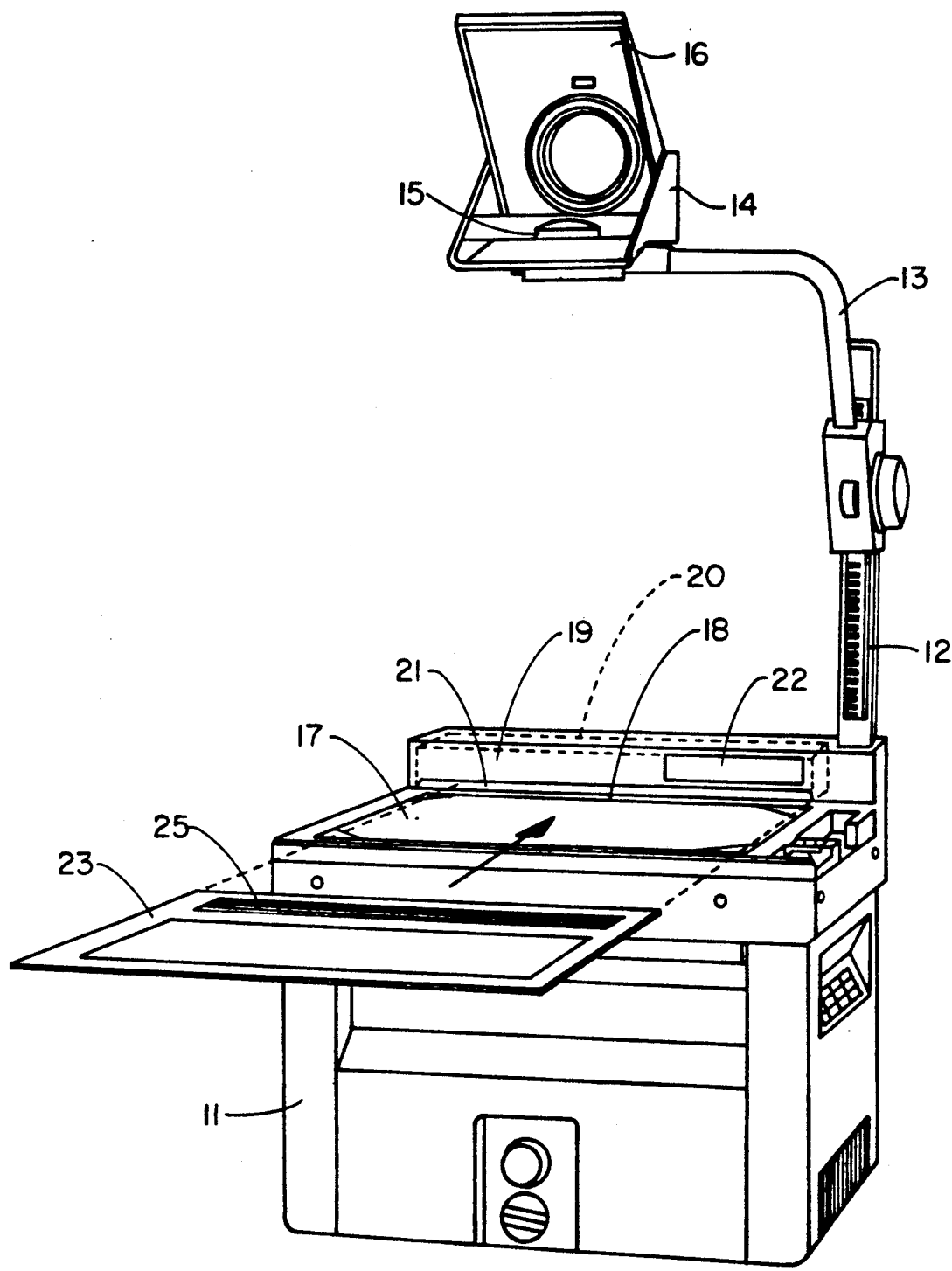

United States Patent [19]

Brauning

[11] Patent Number: 5,159,363
[45] Date of Patent: Oct. 27, 1992

[54] OPTICAL SYSTEM

[75] Inventor: Gerhard Brauning, Ostfildern, Fed. Rep. of Germany

[73] Assignee: Eastman Kodak Company, Rochester, N.Y.

[21] Appl. No.: 640,393

[22] PCT Filed: Dec. 1, 1989

[86] PCT No.: PCT/EP89/01455
§ 371 Date: Jan. 28, 1991
§ 102(e) Date: Jan. 28, 1991

[87] PCT Pub. No.: WO90/06537
PCT Pub. Date: Jun. 14, 1990

[30] Foreign Application Priority Data

Dec. 2, 1988 [DE] Fed. Rep. of Germany ....... 3840628

[51] Int. Cl.$^5$ ............................................. G03B 21/00
[52] U.S. Cl. ..................... 353/122; 353/30; 353/DIG. 3; 353/DIG. 5
[58] Field of Search ............... 353/122, 121, DIG. 3, 353/DIG. 5, 120, 119, 95, 96, 30, 28, 23

[56] References Cited

U.S. PATENT DOCUMENTS

| 4,765,734 | 8/1988 | Truc et al. | 353/120 |
| 4,880,303 | 11/1989 | Grunwald | 353/122 |
| 4,882,599 | 11/1989 | Grunwald | 353/122 |

FOREIGN PATENT DOCUMENTS

| 2853644 | 7/1980 | Fed. Rep. of Germany | 353/DIG. 3 |
| 2559923 | 8/1985 | France | 353/122 |
| 0202442 | 11/1984 | Japan | 353/DIG. 5 |
| 0202443 | 11/1984 | Japan | 353/DIG. 5 |
| 8703384 | 6/1987 | World Int. Prop. O. | 353/122 |
| 9010252 | 9/1990 | World Int. Prop. O. | 353/121 |

Primary Examiner—William A. Cuchlinski, Jr.
Assistant Examiner—William C. Dowling
Attorney, Agent, or Firm—Marianne J. Twait

[57] ABSTRACT

The invention relates to an overhead projector for projecting images, said projector including a liquid crystal display panel arranged in the imaging plane, an optical imaging unit and a lamp and reflector arrangement accommodated in a housing as well as a scanning means for stored data. Adjacent to the platen (18) covering the liquid crystal display panel (17), a data strip scanning means (20) is provided which is accessible from outside. A transparency (23) which shows pictures, diagrams or the like and can be placed on platen (18) comprises a data strip (25) for selective and/or joint projection with the liquid crystal images, said data strip extending into the area of the scanning means (20) when the transparency (23) is placed on platen (18). The data stored on data strip (25) can be supplied in the form of control signals to the liquid crystal display panel (17) via a computer associated with the scanning means (20) so that specific images can be generated on the liquid crystal display panel which supplement the contents of the transparency. In the case of a lecture, the information on the transparency and the images on the liquid crystal display panel can be jointly projected in an enlarged representation on a projection screen so that they can be viewed by a major audience.

1 Claim, 1 Drawing Sheet

OPTICAL SYSTEM

The invention relates to an optical system for projecting images, in particular an overhead projector, comprising a liquid crystal display panel arranged in the imaging plane, an optical imaging unit and a lamp and reflector arrangement accommodated in a housing as well as a scanning means for stored data.

DE-GM 8 702 326 discloses an overhead projector for selectively or jointly projecting information-carrying transparencies and liquid crystal display images, wherein a liquid crystal display panel is mounted on the housing surface such that it can be folded onto and unfolded from the platen as required. Within the projector housing or in a bottom portion thereof, a computer with exchangeable diskettes is accommodated so that the liquid crystal display panel is controlled in response to the data stored on a diskette.

Moreover, a commercially available data strip scanning device is known which comprises an optical scanner by means of which information coded on a narrow data strip is scanned and can be processed in personal computers or system terminals.

It is the object of the invention to develop an overhead projector of the above-mentioned generic type and a data strip scanning device such that they can be used for a greater variety of purposes.

In accordance with the invention this object is attained in that adjacent to the platen covering the liquid crystal display panel, a data strip scanning means is provided which is accessible from outside, in that a transparency which shows pictures, diagrams or the like and can be placed on the platen comprises a data strip for selective and/or joint projection with the liquid crystal images, said data strip extending into the area of the scanning means when the transparency is placed on the platen, and in that the data stored on the data strip can be supplied to the liquid crystal display panel in the form of control signals via a computer associated with said scanning means.

The invention is described with reference to the embodiment illustrated in the drawing.

The single FIGURE of the drawing shows in a perspective view an overhead projector which consists of a housing 11 which accommodates a lamp and reflector arrangement of a type known per se and not illustrated and on one outer wall of which a column 12 is mounted in an upright position. By means of a support arm 13 a holder 14 adapted to hold an optical system 15 as well as a deflecting mirror 16 is arranged on column 12 so as to be adjustable in height.

The upper side of housing 11, which faces the optical system 15 is covered by a liquid crystal display panel 17, the upper side of the liquid crystal display panel 17 being stable enough to serve as a platen 18.

In the embodiment, a data strip scanning means 20 is built into a narrow housing portion 19 which extends across the whole length of the housing 11 in a rear extension of the platen 18, the optical unit of said scanning means being accessible from outside via a slot 21.

Transparencies 23 showing in a known manner pictures, diagrams or the like can be placed on platen 18 for selective and/or joint projection with the liquid crystal images. These transparencies 23 are provided with one or several data strips 25 which may be produced by means of commercially available laser or pin writers and may include any type of information or program.

When a transparency 23 is placed on the platen in the direction of the arrow, the area of the transparency 23 which carries the data strip 25 is moved across the entrace slot 21 into the area of the scanning means 20. The data stored on the data strip 25 are optically scanned and supplied in the form of control signals to the liquid crystal display panel 17 via a computer associated with the scanning means so that specific images are generated on said display panel.

A considerable advantage of the subject matter of the invention consists in that the texts and images to be projected to support a lecture can be stored on the data strip so that in response to the data stored, the liquid crystal display panel can be controlled. The image generated on the liquid crystal display panel supplements the contents of the transparency. The images supporting a lecture can be jointly projected on a screen in an enlarged representation and thus made visible to a large audience.

I claim:

1. An optical system for projecting images, in particular an overhead projector, comprising a liquid crystal display panel including a platen, a housing accommodatintg a lamp and reflector arrangement as well as means for scanning data stored on a data strip including an optical unit, characterized in that data strip scanning means are provided adjacent to the platen covering the liquid crystal display panel for scanning data on a data strip, the data strip being provided on a transparency which shows pictures, diagrams or the like, the transparency is placed on the platen such that the data strip extends into the data strip scanning means wherein the data stored on the data strip is supplied to the liquid crystal display panel in the form of control signals via a computer associated with the data strip scanning means and the liquid crystal display images can be selectively and jointly projected with the pictures or diagrams on the transparency.

* * * * *